(12) United States Patent
Ternulf et al.

(10) Patent No.: US 7,071,952 B1
(45) Date of Patent: Jul. 4, 2006

(54) METHOD FOR INSERTING OBJECTS INTO A WORKING AREA IN A COMPUTER APPLICATION

(75) Inventors: Yngve Ternulf, Gothenburg (SE); Shahram Pourmakhdomi, Molnlycke (SE); Finn Otreus, Molnlycke (SE)

(73) Assignee: Actcon Control AB, Hisings Backa (SE)

( * ) Notice: Subject to any disclaimer, the term of this patent is extended or adjusted under 35 U.S.C. 154(b) by 0 days.

(21) Appl. No.: 09/856,972

(22) PCT Filed: Nov. 30, 1998

(86) PCT No.: PCT/SE98/02183

§ 371 (c)(1),
(2), (4) Date: Jun. 29, 2001

(87) PCT Pub. No.: WO00/33173

PCT Pub. Date: Jun. 8, 2000

(51) Int. Cl.
*G09G 5/00* (2006.01)
*G06F 9/45* (2006.01)

(52) U.S. Cl. ......................................... 345/629; 716/10

(58) Field of Classification Search ................ 345/638, 345/636, 634, 769, 771, 629, 964, 970; 716/1 D, 716/8, 11, 9; 707/4; 715/769, 771
See application file for complete search history.

(56) References Cited

U.S. PATENT DOCUMENTS

| | | | | |
|---|---|---|---|---|
| 4,539,585 A | * | 9/1985 | Spackova et al. | 382/100 |
| 4,546,434 A | * | 10/1985 | Gioello | 700/90 |
| 4,686,522 A | * | 8/1987 | Hernandez et al. | 345/160 |
| 4,742,473 A | | 5/1988 | Shugar et al. | 345/821 |
| 4,922,432 A | * | 5/1990 | Kobayashi et al. | 716/17 |
| 5,051,898 A | * | 9/1991 | Wright et al. | 707/4 |
| 5,175,696 A | * | 12/1992 | Hooper et al. | 716/18 |
| 5,247,610 A | * | 9/1993 | Oshima et al. | 345/630 |
| 5,251,159 A | * | 10/1993 | Rowson | 716/1 |
| 5,408,601 A | * | 4/1995 | Nakamura et al. | 345/808 |
| 5,452,226 A | * | 9/1995 | Hooper et al. | 716/18 |
| 5,481,712 A | | 1/1996 | Silver et al. | 717/109 |
| 5,524,238 A | | 6/1996 | Miller et al. | 707/4 |
| 5,530,865 A | * | 6/1996 | Owens et al. | 709/313 |
| 5,535,134 A | * | 7/1996 | Cohn et al. | 716/8 |
| 5,537,662 A | * | 7/1996 | Sato et al. | 345/860 |
| 5,625,567 A | * | 4/1997 | Mankin et al. | 716/3 |
| 5,644,690 A | * | 7/1997 | Yoshino et al. | 345/634 |
| 5,673,198 A | * | 9/1997 | Lawman et al. | 716/11 |
| 5,680,528 A | * | 10/1997 | Korszun | 345/630 |

(Continued)

FOREIGN PATENT DOCUMENTS

WO 9806219 2/1998

(Continued)

*Primary Examiner*—Ryan Yang
(74) *Attorney, Agent, or Firm*—Birch, Stewart, Kolasch & Birch, LLP (57) ABSTRACT

The present invention relates to a method for facilitating the insertion of an object in a working area on a computer display, and is implemented in a computer application software. The method comprises the steps of indicating at least one subarea of the working area where an object is insertable, indicating an object type in association with each subarea, an object of said object type being insertable in said subarea, receiving input from the user selecting one of the at least one subarea, and inserting in the selected subarea an object of the type that is indicated at the selected subarea. Through this method, the user only needs to provide one single piece of input in order to insert an object in a valid location in a working area.

25 Claims, 5 Drawing Sheets

U.S. PATENT DOCUMENTS

| | | | |
|---|---|---|---|
| 5,691,912 A * | 11/1997 | Duncan | 716/11 |
| 5,706,477 A * | 1/1998 | Goto | 703/14 |
| 5,764,534 A * | 6/1998 | Goetting | 716/11 |
| 5,812,394 A * | 9/1998 | Lewis et al. | 700/17 |
| 5,859,776 A * | 1/1999 | Sato et al. | 700/121 |
| 5,862,379 A | 1/1999 | Rubin et al. | 717/109 |
| 5,926,397 A * | 7/1999 | Yamanouchi | 716/14 |
| 6,023,569 A * | 2/2000 | Yun | 716/15 |
| 6,145,116 A | 11/2000 | Tawada | 716/6 |
| 6,173,245 B1 * | 1/2001 | Karchmer et al. | 703/22 |
| 6,173,433 B1 * | 1/2001 | Katoh et al. | 716/1 |
| 6,201,548 B1 * | 3/2001 | Cariffe et al. | 345/620 |
| 6,209,123 B1 * | 3/2001 | Maziasz et al. | 716/14 |
| 6,215,506 B1 * | 4/2001 | Makino et al. | 345/501 |
| 6,216,253 B1 * | 4/2001 | Maeda | 716/5 |
| 6,230,304 B1 * | 5/2001 | Groeneveld et al. | 716/7 |
| 6,307,568 B1 * | 10/2001 | Rom | 345/629 |
| 6,348,923 B1 * | 2/2002 | Murata | 345/629 |
| 6,360,191 B1 * | 3/2002 | Koza et al. | 703/6 |
| 6,374,390 B1 * | 4/2002 | Quarles et al. | 716/1 |
| 6,438,729 B1 * | 8/2002 | Ho | 716/1 |
| 6,449,761 B1 * | 9/2002 | Greidinger et al. | 716/11 |
| 6,463,574 B1 * | 10/2002 | Culetu et al. | 716/11 |
| 6,631,508 B1 * | 10/2003 | Williams | 716/8 |
| 2002/0116685 A1 * | 8/2002 | van Ginneken | 716/1 |

FOREIGN PATENT DOCUMENTS

WO      9928794      6/1999

* cited by examiner

METHOD FOR INSERTING OBJECTS INTO A WORKING AREA IN A COMPUTER APPLICATION

This application is the national phase under 35 U.S.C. § 371 of PCT International Application No. PCT/SE98/02183 which has an International filing date of Nov. 30, 1998, which designated the United States of America and was not published in English.

TECHNICAL FIELD

The present invention relates to a method for fascilitating the insertion of an object into a working area on a computer display, said method being implemented in a computer application software and comprising the step of receiving input from the user selecting where on the screen an object of a previously specified object type is to be inserted.

BACKGROUND ART

In numerous computer applications, objects are selected by a user and inserted into an area of a computer display. This is especially frequent in different kinds of programming and designing, where objects belonging to several different object types are available to the user for insertion into a working area, such as a worksheet, a document, or any other limited area of a screen, used by the active software application to display objects. The user first clicks on a particular type of object (e.g. a certain type of programming item) and then clicks on the location where an object of the particular type is desired.

In some applications a drag-and-drop procedure is utilized, meaning that the user clicks on the object type and without releasing the mouse button moves the cursor to the desired location and then releases the button. An object of the chosen type is hereby inserted at this location. This functionality is implemented in e.g. Viso from Visio Corp.

In other applications the cursor changes its appearance when an object type is clicked on, to indicate that an object will be inserted at the location of the next click. This functionality is implemented in e.g. Corel Draw.

In some cases, objects of certain object types should only be inserted into specific parts of the working area, or in connection with objects of other predetermined object types. Particularly in certain types of programming, e.g. network PLC-programming, where the overall structure has to follow a predetermined pattern, this is a common situation. Inserting an object into a location where it is not ment to be located may result in a non-working object, or even in a non-working program, with tedious error searching as a result.

It is known in the art to implement test routines for each insertion, in order to avoid erroneous placement of objects. This can either be accomplished by making certain object types unavailable to the user unless certain predetermined conditions are met, or by refusing the insertion of a selected object into certain areas. However, the user then finds him/herself in a situation where the intended operation is impossible to perform, e.g. the object he/she intends to insert into a certain location is refused by the application. This is frustrating, especially as the user does not obtain information regarding why the object cannot be inserted, nor regarding what object can be inserted instead.

An even larger problem with known methods for inserting objects of different types into a working area is the fact that the cursor always needs to be moved between the icons or menus from which the object type is chosen, and the desired location.

Another problem is the icons or menus themselves. If menus are used, it can be difficult to quickly find the desired object type. Sometimes several sub-menus need to be opened in order to find a specific object type. If icons are used they normally provide a better overview, but instead they take up valuable space that is needed for other purposes.

SUMMARY OF THE INVENTION

A first object of the present invention is therefore to provide a method for inserting an object into a working area on a computer screen, that simplifies the procedure.

A second object of the present invention is to provide a method for inserting an object into a working area on a computer screen, wherein the need for icons or menus is eliminated.

A third object of the present invention is to provide a method for inserting an object into a working area on a computer screen, wherein the problem of attempting to make invalid insertions is avoided.

These objects are accomplished by using a method according to the preamble of claim 1, further characterized by the steps of indicating at least one subarea of the working area where an object is insertable, indicating an object type in association with each subarea, an object of said object type being insertable into said subarea, receiving input from the user selecting one of said at least one subarea, and inserting into the selected subarea an object of the type that is indicated at the selected subarea.

This results in a simple procedure for inserting objects into the working area. Instead of having to first select an object type, and then to select a location, the user only has to make one selection. A software implementing the method according to the invention indicates to the user locations where insertions are possible, and what type of object is insertable at each location. The input needed from the user to perform an insertion is thus reduced from two to one. According to the invention, one single piece of input is enough to insert an object at a valid location in the working area.

Further, the need for menus and icons is eliminated, as the user is given clear indications of what objects are insertable into the working area. There is no need to hide, or make unavailable, contents in a menu, as it is only available objects that are displayed.

The method according to the invention is preferably used when restrictions are imposed on what objects can be inserted into the working area, and where they can be inserted. These restrictions can be caused for example by relationships between programming steps constituting a computer program, said steps being represented by the objects, or by physical relationships between processes or physical entities, said processes or entities being represented by the objects.

The inventive method avoids the above mentioned problem of making invalid insertions. These insertions can not even be attempted, as the user, even before the action to insert an object is performed, is made aware of what type of an object is insertable at a certain location.

A software implementing the method performs an identification of all possible, valid insertions of objects into the working area and indicates them to the user. The user only has to decide which of the insertions to perform.

According to one embodiment of the invention, the indication of said at least one subarea of the working area where an object is insertable includes graphically outlining said subarea.

According to another embodiment of the invention, the indication of said at least one subarea is activatable and deactivatable by the user. This makes it possible for the user to examine the results of his/her work without the indications of subareas visible. When the user intends to insert a new object, the indication is simply activated by giving a certain input to the software.

Input from the user is preferably received using a pointing device, preferably in electronic contact with the software application and controlling a cursor on the display.

This makes it very easy for the user to provide input to the software application regarding where in the working area the user wishes to insert an object.

According to a further embodiment of the invention, the step of indicating at least one subarea of the working area where an object of a type that is insertable can be performed in response to the action of moving the cursor into said subarea.

In this way, the step of indicating a subarea is closely associated with the user activity of moving the mouse. No indications of subareas are displayed in the working area unless the user actually moves the cursor in the working area.

The step of indicating an object type in association with each subarea preferably comprises displaying a symbol representing said object type in connection to said subarea. According to one embodiment of the invention, this symbol is displayed by changing the appearance of the cursor, in response to the action of moving the cursor into said subarea.

One application of the method is in the field of network design. Hereinafter, the term "network" is used for any collection of objects, operations, events, processes, options, conditions etc. that logically relate to each other and form part of a system. Networks can appear in many contexts, for example organisation charts, circuit block diagrams or computer programs, and can be designed, or programmed, with the help of a computer in the above mentioned way by inserting objects of different types into a working area. Network programming is particularly useful when designing systems for automatic control, for example PLC-systems.

Normally, several different object types are available, where each type has specific physical properties. One object type can for example represent physical events, while another might represent a conditional step, with several possible outcomes.

BRIEF DESCRIPTION OF THE DRAWINGS

Preferred embodiments of the present invention, given by way of example only, will now be described in more detail, with reference to the accompanying drawings.

DETAILED DESCRIPTION OF PREFERRED EMBODIMENTS OF THE INVENTION

Figure 1:
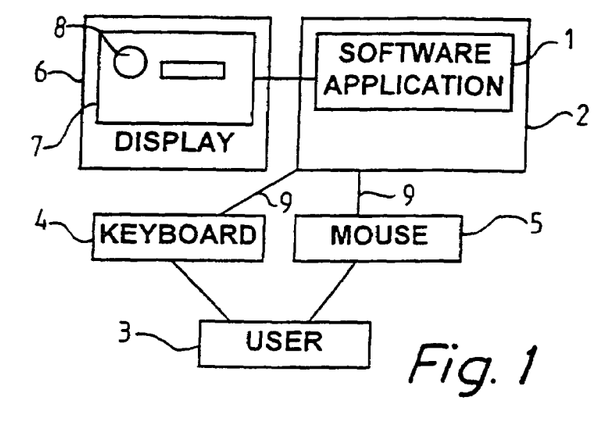
FIG. 1 illustrates an environment in which the method according to the invention may be used.

FIG. 1 illustrates an environment in which the method according to the invention can be utilized. A software application 1, e.g. a programming tool, is installed and running on a computer 2. A user 3 interacts with the application 1, giving instructions 9 to the software application through a keyboard 4 and with a pointing means, preferably a mouse 5. The application presents the results of the user's actions on a display unit, preferably a monitor 6, displaying to the user a working area 7, where operations corresponding to said actions are performed. Said operations may include inserting objects 8 into the working area 7, where they represent for example program actions or physical events.

Figure 2:
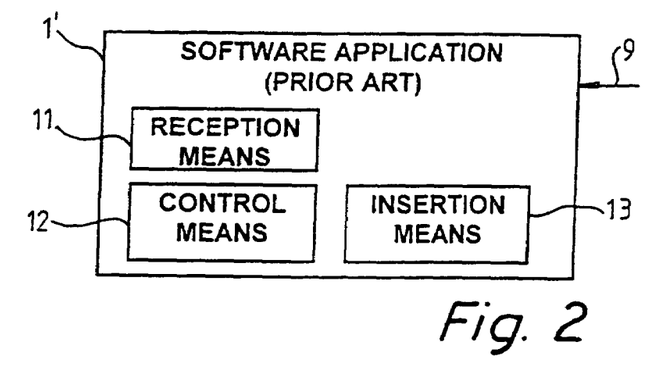
FIG. 2 is a schematic block diagram of a software application according to prior art.

FIG. 2 shows a software application 1' according to prior art, suited for the insertion of objects into a working area. Said application 1' typically includes means 11 for receiving input from the user, means 12 for deciding how to respond to the input from the user, and means 13 to insert objects into the working area 7.

Figure 3:
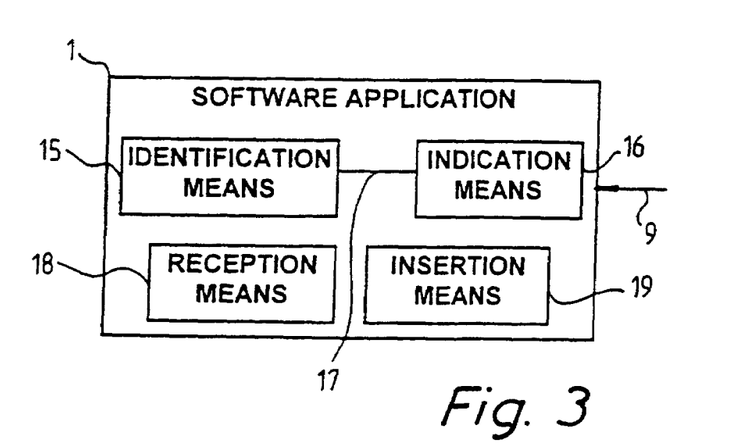
FIG. 3 is a schematic block diagram of a software application according to the present invention.

FIG. 3 shows a software application 1 according to the present invention. The software comprises identification means 15 for identifying valid insertions of objects 8 into the working area 7. This means 15 is similar in structure to the means 12 in prior art, but with the important difference that it operates without waiting for user input. Instead of, as in prior art, controlling whether an insertion of an object requested by the user is in fact a valid insertion, the means 15 are operative to constantly identify locations in the working area where objects 8 are insertable, and what type of object is insertable in every location. In short, the means 15 anticipate all possible insertions that can be requested by the user, and identifies the ones that are valid.

Further, the application 1 is provided with indication means 16, for indicating information to the user on the monitor. Again, the structure of means 16 is not in itself unique, and similar indication techniques can be found in many software applications. According to the invention, however, the indication means 16 use identification data 17, supplied by the identification means 15, to indicate all available, valid insertions to the user in the present situation.

The software application 1 also comprises reception means 18 and insertion means 19, similar to the reception means 11 and the insertion means 13 of the prior art, respectively.

In the present context, the means 15, 16, 18, 19 are software routines included in the application 1. Of course, and as is well understood by a person skilled in the art, in some cases one or several of these means 15, 16, 18, 19 can be comprised of separate software, or software associated with e.g. the monitor or mouse, said software operating together with the software application 1.

In the following description of the method according to the invention, said software application 1 is a program network design tool, a working area 7 of which is shown in FIG. 4. This type of programming is used for example in PLC-programming.

In the illustrated example, the program network 20 comprises two types of items, namely step items 21, which represent one or several physical actions, and transition items 22, which define conditions for moving the program control from one step item to another. Each item is represented by an object 21, 22 in the working area 7, and the relationship between the two types of items impose restrictions on how items can be inserted into the working area. For example, two step items cannot be connected to each other without an intermediate transition item.

Reference numerals 23a, 23b, 23c, 23d indicate four of several subareas in the working area 7, where objects are insertable. The subareas are naturally located in connection to the existing network, as this is where new objects can be inserted.

In the illustrated example, the subareas 23a, 23b, 23c, 23d are outlined by rectangles 25, which identify and limit each subarea. Of course, any indication using graphics, colour or text is possible. Further, in the vicinity of each subarea 23a–d, an object type 26a–d is indicated. Again, in the illustrated example, the object type 26a–d associated with each subarea 23a–d respectively, is indicated by a symbol which represents the associated object type 26a–d.

In the illustarted example, an inserted object normally includes an step item 21 and a transition item 22. Depending on where the object is inserted, however, the order of the two items vary. In subarea 23a, an object consisting of a transition item followed by an step item is insertable. This object type is represented by the symbol 26a. In subarea 23b, the order is reversed, and this object type is represented by the symbol 26b.

Another possible object is a fork 24a, 24b, which indicates a division of the network path. A fork can be inserted before (23c) or after (23d) a transition, and different symbols, 26c and 26d respectively, are associated with the two types of forks.

Figure 5:
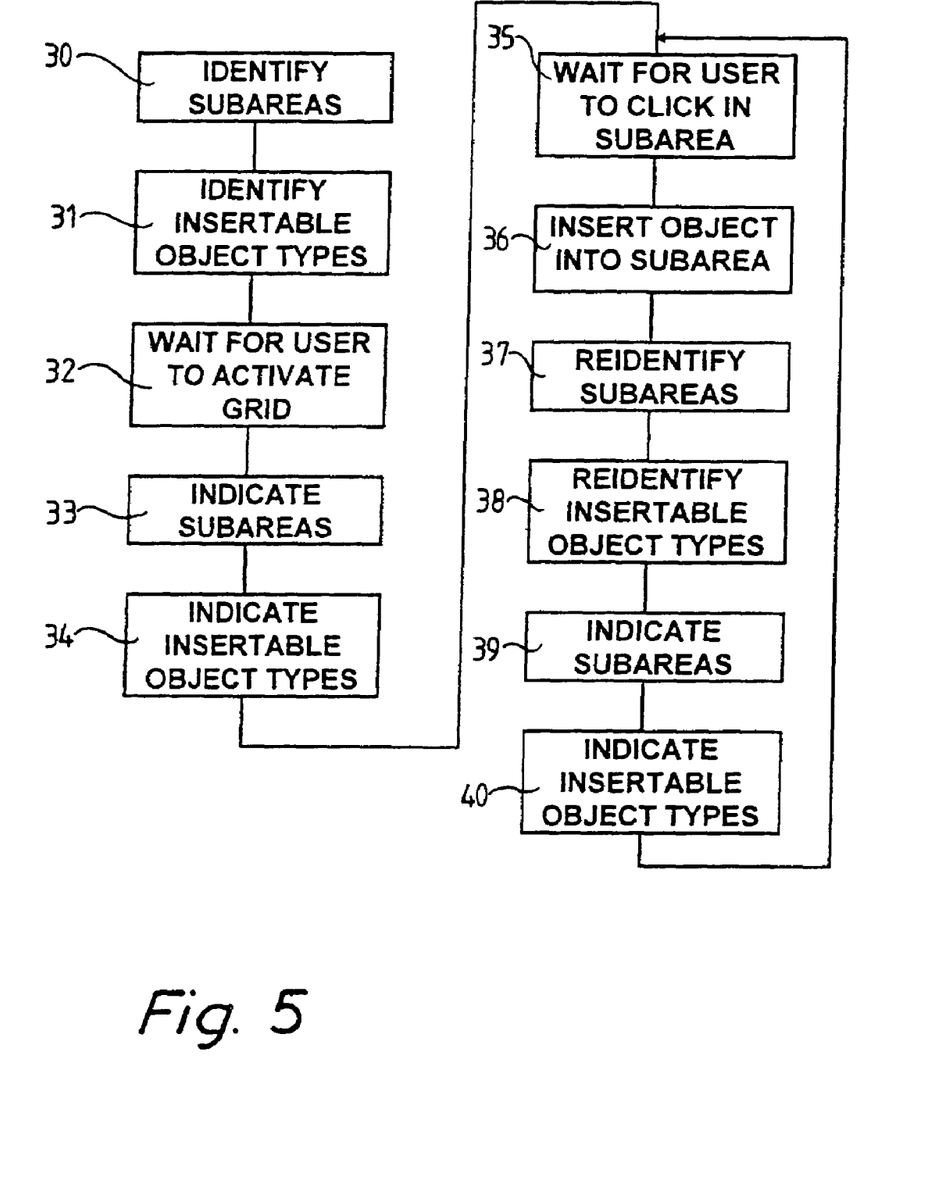
FIG. 5 is a flowchart of a first embodiment of the method according to the invention.

FIG. 5 illustrates schematically a first embodiment of the method according to the invention. In step 30, the identification means 15 identifies subareas 23a, 23b of the working area where objects are insertable. Further, in step 31, the identification means 15 identifies what type of object can be inserted in each subarea. As mentioned, following a step item there must be a transition item and vice versa.

When the identification of subareas and insertable object types is performed, the program control waits (in step 32) for the user to activate a grid 25, 26a–d. This activation can be accomplished by hitting a key on the keyboard 4 or by using the mouse. Reception means 18 are arranged to receive and respond to such input by instructing the indication means 16 to activate the grid. The grid 25, 26a–d can take on any number of forms, but has the purpose of indicating a plurality of subareas in the working area 7 (step 33 in FIG. 5), and in association with each subarea an object type (step 34 in FIG. 5). Both steps 33 and 34 are performed by the indication means 16, which have received identification data 17 from the identification means.

The program control now waits for the user to click in one of the subareas (step 35), preferably using the mouse 5. Once a click in a subarea is detected by the reception means 18, the insertion means 19 inserts an object of the indicated object type into the subarea. For example, if the user clicks in subarea 23a, an object of type 26a, consisting of a transition item and an step item is inserted into the subarea. Note that the user accomplishes the entire insertion with just one click. As an insertable, valid object type is associated with each subarea, a selection of one of the subareas is sufficient for inserting an object.

This insertion affects the network, typically extending it to include more items. The result of the insertion described above is the network 20' shown in FIG. 4b. The program control now instructs the identification means 15 to reidentify subareas and insertable object types (step 37 and 38). This results in an update of the grid in step 39 and 40, again using the indication means 16.

The program control then returns to step 35, and again waits for the user to click in a subarea, for the insertion of a new object. Of course, when the program control waits at for example step 35, the user can choose to deactivate the grid or to peform other actions in the application, such as provide an item with additional data, define parameters etc.

Figure 6:
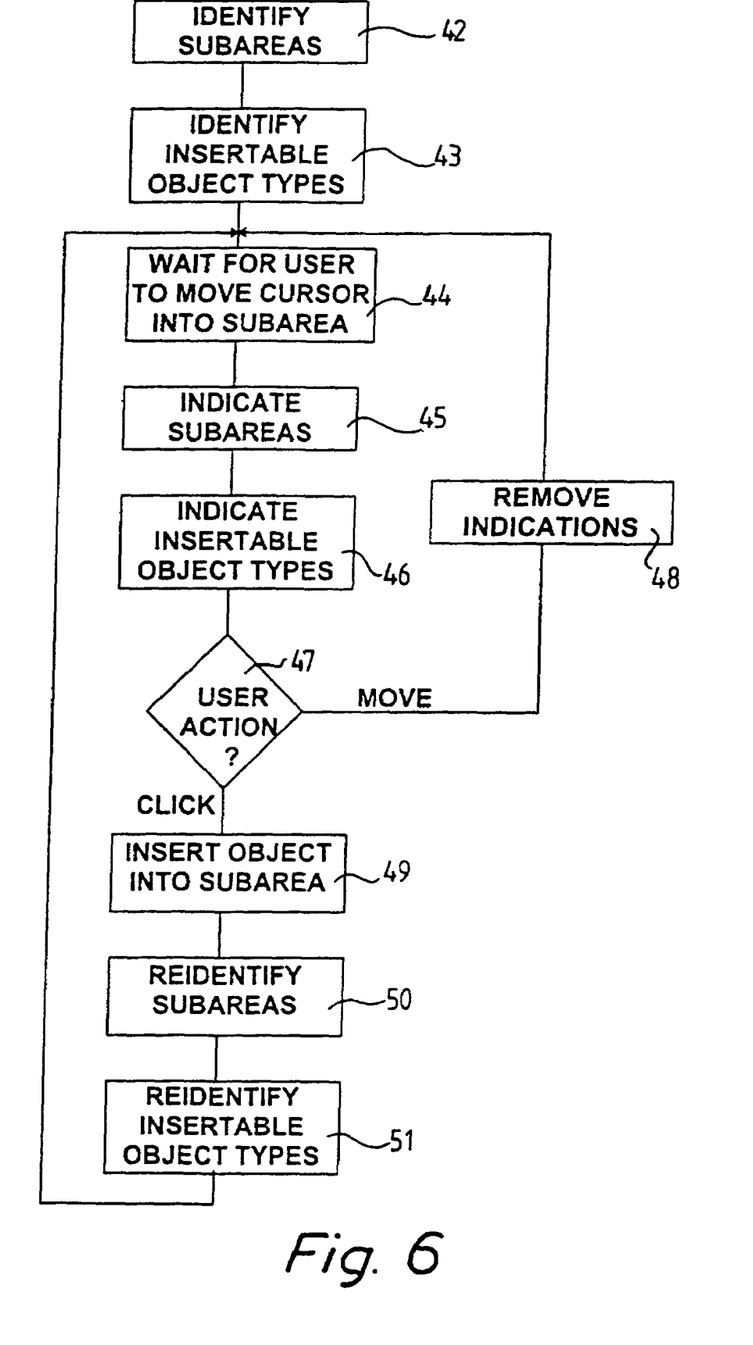
FIG. 6 is a flowchart of a second embodiment of the method according to the invention.

Another embodiment of the method according to the invention is showed in FIG. 6. Just as in FIG. 5, the first two steps 42, 43 identify subareas and insertable object types. Then, however, the program control waits for the user to move the mouse cursor into one of the subareas before (step 44). When the reception means 18 receive information of this situation, the indication means 16 are instructed to indicate this particular subarea (step 45) and the object type that is insertible into this subarea (step 46).

Figure 4A:
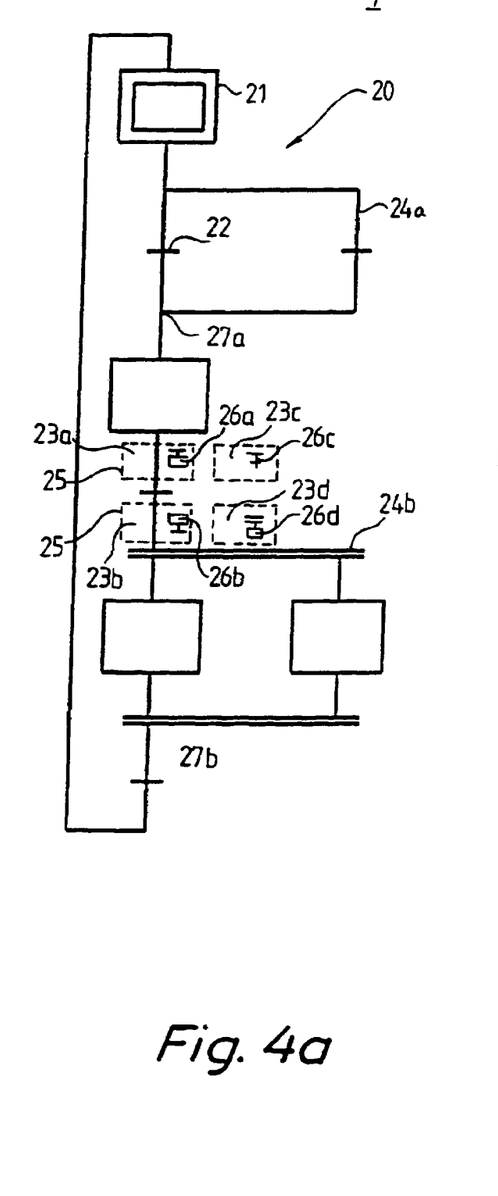
FIG. 4 is an example of a working area on a display.
Figure 4B:
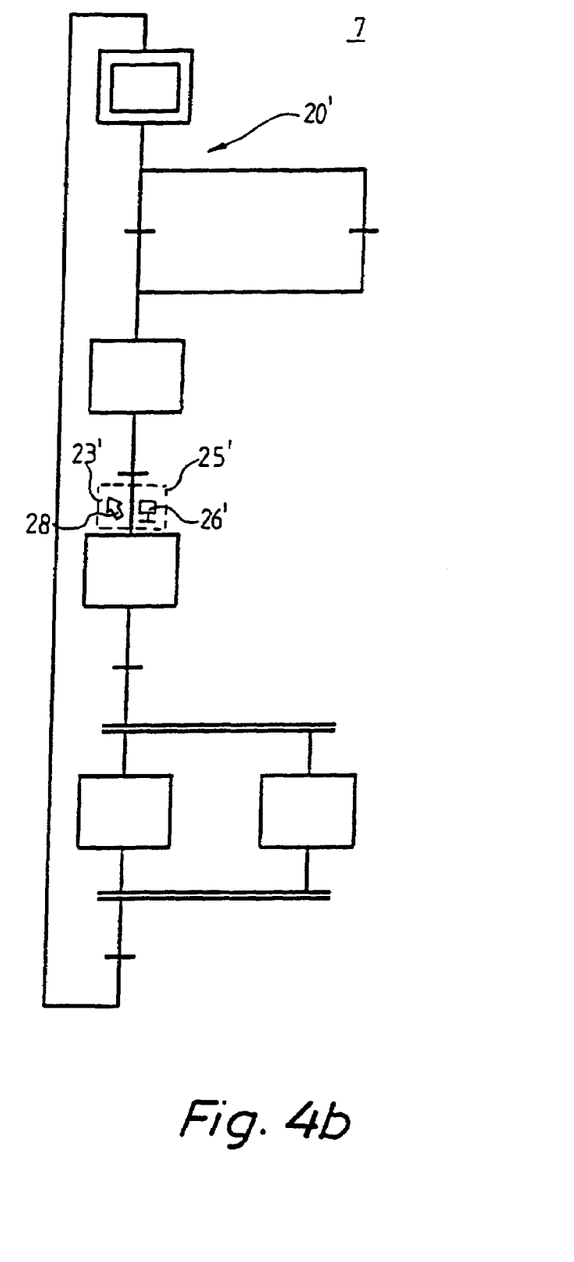
Figure 4C:
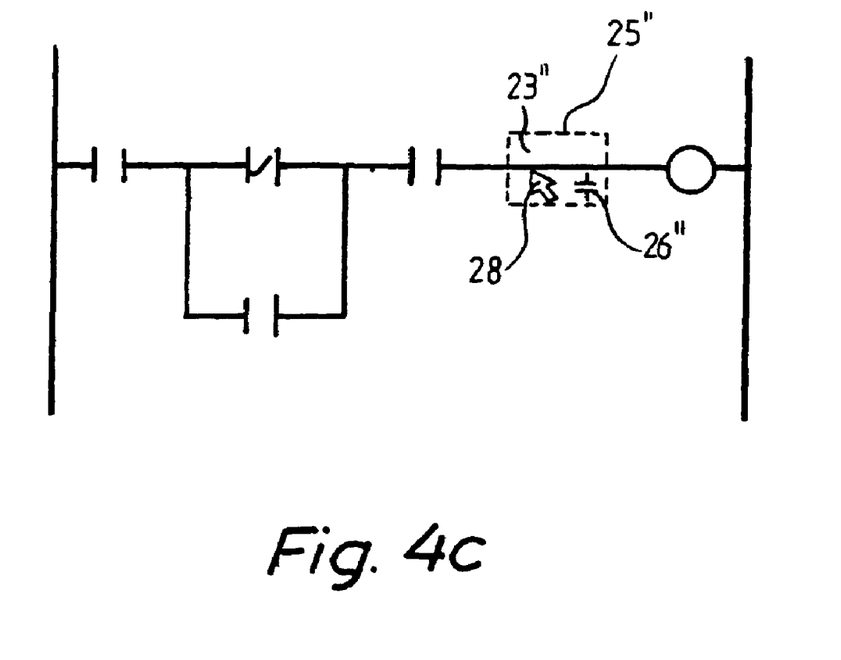

This indication technique is illustrated in FIGS. 4b and 4c, where the cursor 28 is located in a subarea 23', 23", resulting in the indication of the subarea and object type with a rectangle 25', 25" and a symbol 26', 26".

The program control then waits for a user action (step 47). If the user moves the mouse cursor out of the subarea (move), the indications of subarea and insertable object type are removed (step 48) and program control returns to step 44.

If the user does not move the cursor, but instead clicks in said subarea (click) an object is inserted into the subarea (step 49). This insertion affects the network, typically extending it to include more items. Therefore, the program control now instructs the identification means 15 to reidentify subareas and insertable object types (step 50 and 51), before returning to step 44.

Of course, it is possible, and even advantageous, to implement a combination of the two embodiments described above. For example, a grid including only the rectangles 25 can be activated and deactivated, and at the same time the mouse cursor appearance changes to indicate what type of object is insertable into a subarea.

In some cases, for example when a fork 24a, 24b is inserted into the working area 7, it can be necessary to indicate a second location 27a, 27b, nemely where the fork rejoins with the main path of the network. When this is the case, the insertion of an object 36, 49 is followed by a program step 52, 53 waiting for additional user input.

If, in one subarea, objects of different object types are insertable, this can be indicated by dividing the rectangle 25 into several smaller fields, each with an object type indicated in its vicinity. Alternatively, a list or table can be displayed beside the subarea, indicating different insertable objects.

Another solution is to indicate one object type when the cursor is moved into the subarea. Then, when the user presses the mouse button, alternative object types are indicated. The user can then move the cursor to the desired object type, and release the button in this location, resulting in an insertion of an object of this type. Note that the user still only makes one click with the mouse, although a cursor move is possibly made between the press and release actions.

Another solution, preferred by the applicant, is to indicate several subareas of the standard size, next to each other, each one with one associated object type. This is illustrated in FIG. 4a, where objects 26a/26c and 26b/26d are insertable at the same location. When the user selects one of the subareas 23a/23c, 23b/23d, an object of the type indicated in that particular subarea is inserted, and the surrounding subareas are hidden or moved in the update following the insertion.

Many variations of the method according to the present invention are possible to a person skilled in the art. The appearance of the indications can, for example, be changed without loosing the functionality intended in the claims.

What is claimed is:

1. A method for creating a logical network by inserting a plurality of objects into a working area on a computer display, comprising the steps of:
    displaying an existing network in said working area;
    identifying at least one subarea of the working area where an object is validly insertable into said network;
    identifying at least one type of object that can be validly inserted into the network in said subarea;
    visually indicating said at least one subarea;
    visually indicating said at least one object type in association with each indicated subarea;
    receiving input from the user selecting one of said at least one object type indicated in association with one of said at least one subarea; and
    displaying an extended network where an additional object of the selected type is inserted into the selected subarea, and
    said steps being performed by a computer application software for creating a logical network.

2. The method according to claim 1, wherein the step of identifying at least one subarea of the working area where an object is insertable into said network comprises the step of graphically outlining said at least one subarea.

3. The method according to claim 1 or 2, wherein the identification of said at least one subarea is activatable and deactivatable by the user.

4. The method according to claim 1, wherein input from the user is received using a pointing device.

5. The method according to claim 4, wherein the pointing device is in electronic contact with the computer application and controls a cursor on the display.

6. The method according to claim 4 or 5, wherein the step of identifying at least one subarea of the working area where an object is insertable into said network comprises the step of graphically outlining said subarea when the cursor is moved into said subarea.

7. The method according to claim 4, wherein the step of indicating an object type in association with each subarea comprises the step of displaying a symbol representing said object type in connection to said subarea.

8. The method according to claim 5, wherein the step of indicating an object type in association with each subarea comprises the step of changing the appearance of the cursor.

9. The method according to claim 1, wherein the object types represent various physical items that are inserted into the working area to create said network.

10. The method according to claim 9, wherein the network represents a system for automation.

11. A computer-readable medium, on which is stored instructions for one or several general purpose computers, comprising means for enabling said one or said several computers to perform the steps of the method according to claim 1.

12. An apparatus for creating a logical network by inserting a plurality of objects into a working area on a computer display, comprising:
    means for displaying an existing network in said working area;
    means for identifying at least one subarea of the working area where an object is validly insertable into said network;
    means for identifying at least one type of object that can be validly inserted into the network in said subarea;
    means for visually indicating said at least one subarea on the computer display;
    means for visually indicating said at least one object type in association with each indicated subarea on the computer display;
    means for receiving input from the user selecting one of said at least one object type indicated in association with one of said at least one subarea; and
    means for displaying an extended network where an additional object of the selected type is inserted into the selected subarea,
    wherein a computer application software is used to create the logical network.

13. The apparatus according to claim 12, wherein the means for identifying at least one subarea of the working area where an object is insertable into said network comprises means for graphically outlining said at least one subarea.

14. The apparatus according to claim 12 or 13, wherein the identification of said at least one subarea is activatable and deactivatable by the user.

15. The apparatus according to claim 12, wherein input from the user is received using a pointing device.

16. The apparatus according to claim 15, wherein the pointing device is in electronic contact with the computer application and controls a cursor on the display.

17. The apparatus according to claim 15 or 16, wherein the means for identifying at least one subarea of the working area where an object is insertable into said network comprises means for graphically outlining said subarea when the cursor is moved into said subarea.

18. The apparatus according to claim 15, wherein the means for indicating an object type in association with each subarea comprises means for displaying a symbol representing said object type in connection to said subarea.

19. The apparatus according to claim 16, wherein the means for indicating an object type in association with each subarea comprises means for changing the appearance of the cursor.

20. The apparatus according to claim 12, wherein the object types represent various physical items that are inserted into the working area to create said network.

21. The apparatus according to claim 20, wherein the network represents a system for automation.

22. The method according to claim 1, wherein the step of visually indicating said at least one object type in association with each indicated subarea includes visually indicating said at least one object type with the existing network in said working area.

23. The method according to claim 1, wherein the step of visually indicating said at least one object type in association with each indicated subarea includes visually indicating said at least one object type within the associated indicated subarea.

24. The apparatus according to claim 12, wherein the means for visually indicating said at least one object type in association with each indicated subarea includes means for visually indicating said at least one object type with the existing network in said working area.

25. The apparatus according to claim 12, wherein the means for visually indicating said at least one object type in association with each indicated subarea includes means for visually indicating said at least one object type within the associated indicated subarea.

* * * * *